US006656541B1

(12) United States Patent
Archer et al.

(10) Patent No.: US 6,656,541 B1
(45) Date of Patent: Dec. 2, 2003

(54) REPAIR OF FLAWS OR VOIDS IN BODIES USING VIBRATION

(75) Inventors: Mathew Derek Archer, Gwent (GB); Christopher Davies, Carmarhtenshire (GB); Darren Bates, Noosaville (AU)

(73) Assignee: Carglass Luxembourg S.A.R.L.-Zug Branch, Zug (CH)

( * ) Notice: Subject to any disclaimer, the term of this patent is extended or adjusted under 35 U.S.C. 154(b) by 0 days.

(21) Appl. No.: 09/786,194

(22) PCT Filed: Dec. 21, 1999

(86) PCT No.: PCT/GB99/04337

§ 371 (c)(1), (2), (4) Date: Aug. 13, 2001

(87) PCT Pub. No.: WO00/38916

PCT Pub. Date: Jul. 6, 2000

(30) Foreign Application Priority Data

Dec. 23, 1998 (GB) .............................. 9828276

(51) Int. Cl.[7] .................................. B06B 1/00
(52) U.S. Cl. .................... 427/600; 427/140; 427/163.1; 118/57; 264/36.21; 425/12
(58) Field of Search .................. 427/600, 140, 427/142, 163.1, 355; 118/57, 100; 264/36.21; 425/12

(56) References Cited

U.S. PATENT DOCUMENTS

| 3,562,366 A | * | 2/1971 | Sohl ........................... 264/443 |
| 3,645,855 A | * | 2/1972 | Wisman ....................... 205/115 |
| 3,934,460 A | * | 1/1976 | Sherwin et al. ............... 73/642 |
| 3,988,400 A | | 10/1976 | Luhman, III .................. 264/36 |
| 4,047,863 A | | 9/1977 | McCluskey et al. ........... 425/13 |
| 4,597,727 A | * | 7/1986 | Birkhauser, III ............. 425/12 |
| 4,744,841 A | | 5/1988 | Thomas ....................... 156/73.6 |
| 4,921,411 A | | 5/1990 | Ottenheimer ................. 425/12 |
| 5,792,480 A | | 8/1998 | Thomas ....................... 425/12 |
| 6,056,735 A | * | 5/2000 | Okada et al. .................. 606/1 |

FOREIGN PATENT DOCUMENTS

| DE | 2 413 965 | 10/1974 |
| WO | WO98/06566 | 2/1998 |

* cited by examiner

Primary Examiner—Katherine A. Bareford
(74) Attorney, Agent, or Firm—Finnegan, Henderson, Farabow, Garrett & Dunner, L.L.P.

(57) ABSTRACT

An apparatus for repairing a crack in a vehicle windshield includes a high frequency vibration applicator and repair material. The high frequency vibration applicator includes a high frequency vibration generator, an elongate vibration delivery probe, and a handle grip for manipulation of the high frequency vibration applicator by a user. The vibration delivery probe delivers high frequency vibration from the generator to the windshield via a tip of the probe. A method of repairing a crack in a vehicle windshield includes infilling the crack with a repair material, applying to the windshield a tip of an elongate vibration delivery probe of a high frequency vibration applicator, and manipulating the high frequency vibration applicator to track the probe in a longitudinal direction of the crack.

18 Claims, 3 Drawing Sheets

REPAIR OF FLAWS OR VOIDS IN BODIES USING VIBRATION

This case is a national stage application of PCT/GB99/04337, filed Dec. 21, 1999.

BACKGROUND OF THE INVENTION

The present invention relates to repair of flaws or voids in bodies, and in particular to repair of surface accessible flaws or voids in bodies such as cracks, breaks or pits in glazing panels or the like.

Flaws or voids such as cracks in bodies such as glazing panels occur in a variety of configurations. For example damaged vehicle windscreens may exhibit elongate running cracks, or breaks classified in the art as, for example, 'bulls-eye' 'starbreak', 'clover leaf', 'bee's wing', 'half moon' or 'combination'. Frequently such damage flaws are repaired by means of introducing a repair material into the flaw or void, and subsequently hardening the repair material. For example, for repairing crack damaged glazing panels (such as vehicle windscreens) a flowable resin is introduced into the crack and subsequently permitted to harden. Repair resin may be applied under vacuum (to enhance de-gassing of the resin), and mechanical means (such as a plunger) may be utilised to force the resin into the crack. An arrangement has been proposed in which high frequency vibrations are imparted to the body to promote resin infilling breaks. Such an arrangement is disclosed in U.S. Pat. No. 3,562,366.

SUMMARY OF THE INVENTION

An improved repair technique has now been devised.

According to a first aspect, the invention provides a method of repairing a flaw or void in a body, the method comprising infilling the flaw or void with a repair material, wherein high frequency vibration means is applied to act on the body, the high frequency vibration means including a vibration delivery probe of a rigid material.

According to a second aspect, the invention provides apparatus for use in repairing a flaw or void in a body, the apparatus comprising high frequency vibration means including a vibration delivery probe of a rigid material, the probe being positionable to act on the body.

The use of a rigid material for the delivery probe (preferably a hard metallic material such as titanium) enables ultrasonic vibration of sufficient amplitude to be achieved to cause resultant desirable physical effects in the flowable (typically liquid) repair material.

The vibration means preferably comprises ultrasonic vibration means desirably operating substantially in the range 20 KHz–150 KHz (more preferably substantially in the range 35 KHz–55 KHz). The vibration means therefore preferably comprises ultrasonic vibration means arranged to effect vibration substantially in the range 20 KHz–150 KHz (more preferably substantially in the range 35 KHz–55 KHz). The ultrasonic vibration means preferably includes an ultrasonic transducer.

The vibration means is preferably applied in the region of the flaw or void. Desirably the probe is tracked along the direction of an elongate flaw or void (crack).

In one embodiment, the vibration means may be hand held and manipulated digitally by an operative.

The rigid vibration delivery probe preferably includes a contact surface or tip for contacting the body or other vibration transmission medium.

The rigid vibration delivery probe preferably comprises an elongate rigid probe extending from a high frequency generator to the contact surface or tip. The distal contact portion or tip of the rigid material probe is typically of smaller sectional area relative to a portion of the probe less distal. The cross sectional area of the contact surface or tip is preferably at or below 1 cm$^2$ (more preferably at or below 0.5 cm$^2$).

The technique is particularly useful where the flaw comprises a crack, break, pit or discontinuity in the material of the body connecting to a surface of the body, especially where the body comprises a sheet of material, particularly a glazing or window element.

The repair material preferably comprises a flowable repair material such as a fluid or the like, desirably a viscous fluid such as a resin. The repair material preferably has optical qualities (when hardened) substantially matching optical properties of the body. Desirably, the body is substantially transparent at least to one or more wavelengths of visible light.

In one embodiment, the repair material is first applied to at least partially penetrate the flaw or void, the vibration means being subsequently applied to effect enhanced penetration of the repair material into the flaw or void. Alternatively, the repair material and the vibration means may be applied contemporaneously.

In one embodiment, the repair material may be applied to the region of the flaw or void, a cover positioned over the repair material and the vibration means applied to act on the body. The vibration means may be applied directly to the cover, or, alternatively, the cover may be positioned to overlay an obverse surface of the body, the vibration means being applied to a reverse surface of the body. As a further alternative, the vibration means may be applied to a reverse surface or applied directly to the repair material in situ without utilisation of a cover. In a preferred embodiment, the vibration means is applied adjacent the flaw or void, advantageously at a level below the flaw or void. A coupling material (such as a coupling gel) may be applied to the body for enhanced vibration transmissive coupling of the vibration means.

According to a further aspect, the invention provides a kit for repairing a flaw or void in a body, the kit including:

i) apparatus as herein defined; and, ii) repair material for infilling the flaw or void.

The apparatus may further include a cover sheet or strip for covering the resin in situ in the flaw or void and/or a vibration coupling material.

By providing high frequency vibration for the body to be repaired, the mechanical vibration of the body aids in effecting full penetration of the repair material into the flaw or void. Furthermore, where the repair material is a fluid or gel (such as a resin), the applied high frequency vibration acts to reduce the viscosity and promote flow of the repair material. De-gassing of such repair material is also promoted by the ultrasonic vibration which results in a superior optical quality repair.

BRIEF DESCRIPTION OF THE DRAWINGS

The invention will now be further described in specific embodiments by way of example only and with reference to the accompanying drawings, in which.

DETAILED DESCRIPTION OF EXEMPLARY EMBODIMENTS

Figure 1:
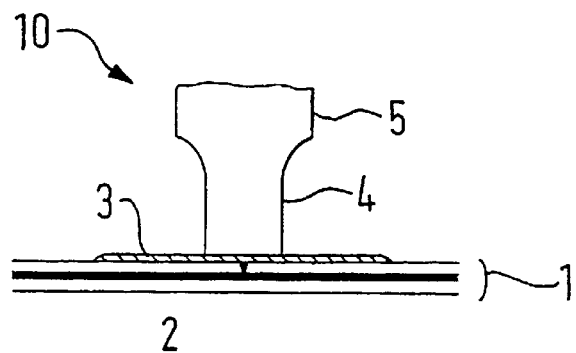
FIGS. 1, 2, 3, 4, 5, and 6 show alternative embodiments of repair techniques in accordance with the invention.

Referring to the drawings a laminated vehicle windscreen 1 has an elongate crack running across a portion of the screen 2 communicating with the upper surface of the windscreen, which is consequently in need of repair. In accordance with the invention, liquid resin 3 is applied to the region of the crack 2 and a tip 4 of a titanium probe of an ultrasonic applicator head 10 is applied to induce high frequency vibration to act on the windscreen 2 and resin 3 in order to aid penetration of the resin into the crack 2.

The ultrasonic probe tip 4 is operated to produce high frequency vibration at a vibration frequency of 40 kHz. This frequency has been found to produce optimum results, although the technique is believed to be operable with frequencies in the range 20–150 KHz (particularly in the range 35–55 KHz). Lower frequencies in the range specified permit the required energy to be delivered but minimise coupling losses. The head 10 includes an ultrasonic transducer 5 and a removable probe tip in the form of horn 4. For repairing the elongate crack 2 the probe tip is traversed along the crack, preferably manually by hand or alternatively in conjunction with a guide support frame (see later).

In the arrangement shown in FIG. 1 the probe tip 4 is applied directly to contact a bead of resin 3 overlaying (and partially penetrating) the crack 2.

Figure 2:
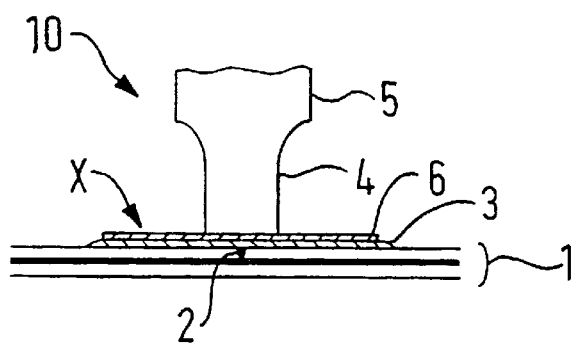

In a preferred embodiment shown in FIG. 2, repair resin in liquid form is applied to a length of crack 2 and a a flexible sheet or strip of a plastics material (such as commercially known Mylar film membrane) 6 is placed against the screen surface to cover the resin 3 in the length of crack 2. The plastics strip or sheet 6 is secured to the screen 1 by means of adhesive tape (to produce a sealed pocket about the resin in crack 2). Alternatively, an adhesive may secure the plastics sheet or strip to the screen 1. The plastics strip or sheet may be adhesive backed for this purpose. Sealing of the sheet or strip to the windscreen surface reduces the amount or oxygen entering the resin which aids in providing a crack repair having optimum optical qualities.

The ultrasonic vibrator probe tip 4 is placed in contact with the plastics sheet or strip 6 to form a barrier between the resin 3 and probe tip 4, but which still permits vibration transmission between the probe tip 4 and the resin and windscreen 1. The probe tip 4 is preferably applied to the strip 6 (or possibly directly to the windscreen surface) at a position adjacent to, and preferably below, the crack 2 (the position denoted by arrow X in FIG. 2. The horn tip is then drawn along a line following the line of the crack 2.

Figure 3:
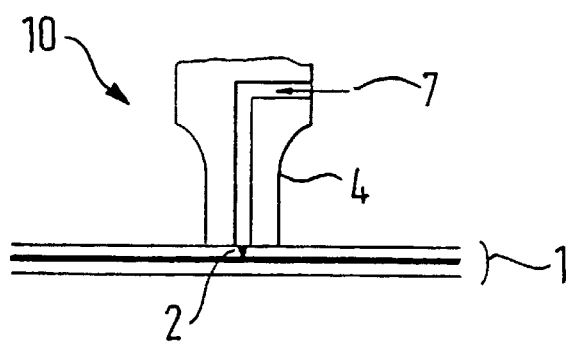

In the embodiment in FIG. 3 resin is delivered via an external conduit 7 extending along the length of probe tip 4 to exit via an aperture in the probe tip 4 directly into crack 2. Ultrasonic vibration of probe tip 4 results in at least partial atomisation of the resin flowing along conduit 7 which aids in penetration into the crack 2.

Figure 4:
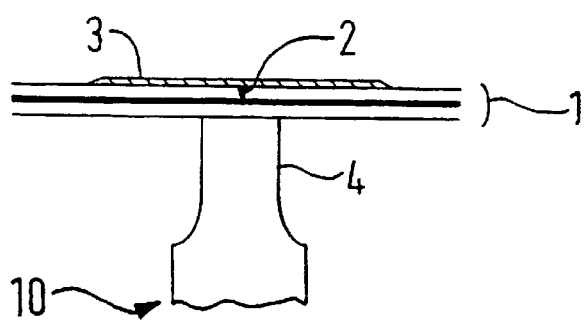

In the embodiment shown in FIG. 4, the resin is placed in contact with the outer surface of the windscreen 1 but the probe tip 4 of the ultrasonic vibration apparatus is placed in contact with the reverse face of the windscreen adjacently crack 2.

Figure 5:
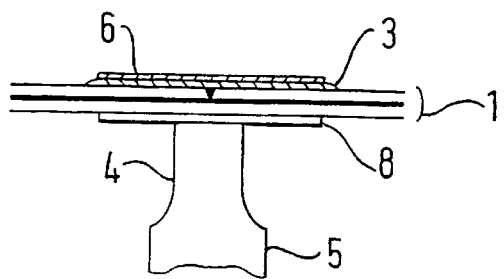

In the embodiment shown in FIG. 5, the arrangement corresponds to that shown in FIG. 4, however a Mylar film membrane 6 is places over the resin (to minimise oxygenation) and an ultrasonics coupling material 8 (such as a coupling gel or plastics or rubber mat) is placed between the probe tip 4 and the reverse face of the windscreen 1. The coupling material 8 aids in transmission of high frequency vibration from the probe tip 4 to the windscreen 1. Such a coupling material can be utilised for any of the embodiments described herein.

Figure 6:
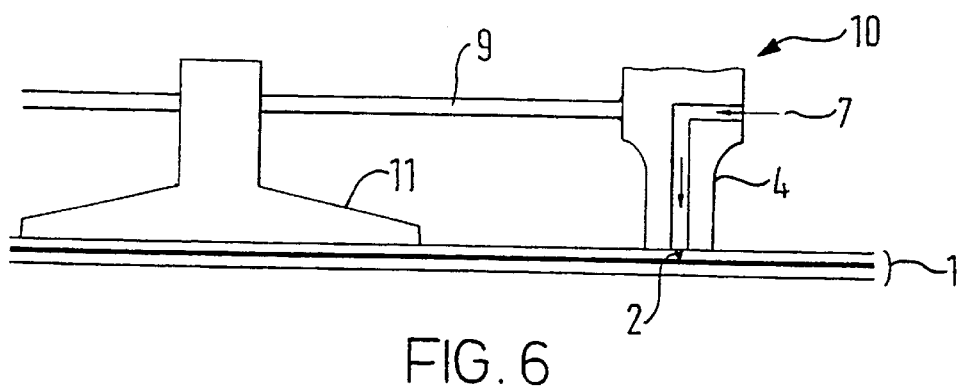

In the embodiment shown in FIG. 6, the ultrasonic vibrating apparatus 10 is mounted by means of an arm 9 to a suction cup 11 which adheres to the outer surface of windscreen 1. Various suction/vacuum arrangements for securing the vibration head 10 to the windscreen are envisaged and such embodiments are disclosed in, for example, the prior art references referred to on page 1. Additionally, the head 10 can be movable relative to the support arm 9 toward and away from the windscreen 1 (for example by being screw thread mounted on arm 9) permitting the tip of horn 4 to be advanced toward the windscreen for pressing the resin 3 into crack 2 and subsequent retraction away from the windscreen.

Figure 7:
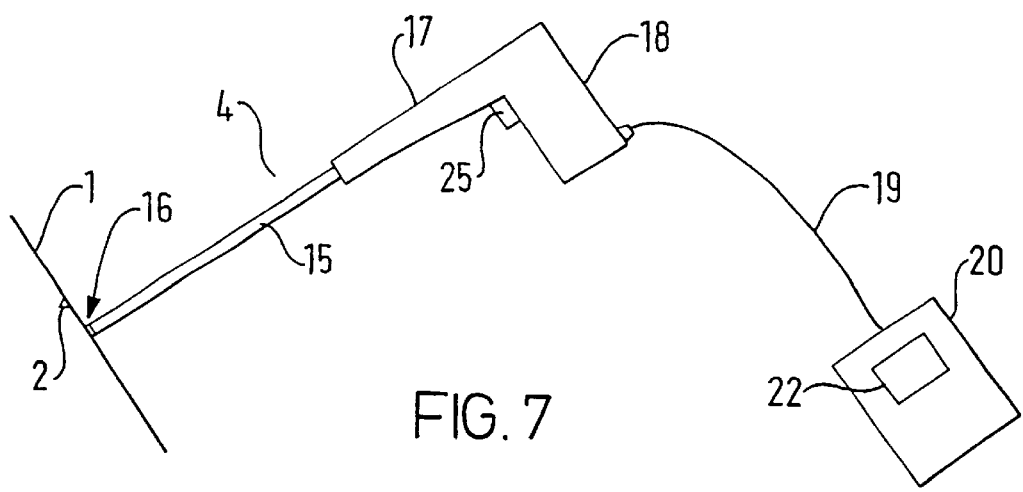
FIG. 7 is a schematic side view of an alternative embodiment of an apparatus for performing the techniques of FIGS. 1 to 6.

Referring to a preferred embodiment of apparatus shown in FIG. 7, the probe comprises an elongate metallic probe 15, having a tip 16 arranged to contact the windscreen or the plastics sheet or strip 6 (or the resin directly). The elongate probe 15 extends from a pistol shaped housing 17, having a handle grip 18 for manipulation by the user. The housing 17 contains an ultrasonic transducer and the power supply is provided by a remote powerpack 20 (connected by an umbilical 19) which is provided with a clip 22 for mounting the powerpack to an item of the users clothing (such as a belt). The apparatus is operated to deliver ultrasonic vibration via probe tip 16 by operation of trigger 25.

Separation of the powerpack 20 from the transducer housing 17 and probe 15 enables the apparatus to be more conveniently manipulable. In the technique shown in FIG. 7, the probe tip 16 is applied directly adjacently beneath the elongate crack 2 (running in a direction into and out of the paper) and tracked along the windscreen 1 adjacent the crack 2.

For any of the embodiments described, the ultrasonic probe tip 4 may revisit part of the crack 2 (where air may remain trapped in the resin) following initial application. Resin within the crack 2 is subsequently cured in a conventional manner using UV activation or by any other suitable curing means depending on the particular resin being utilised.

Figure 8:
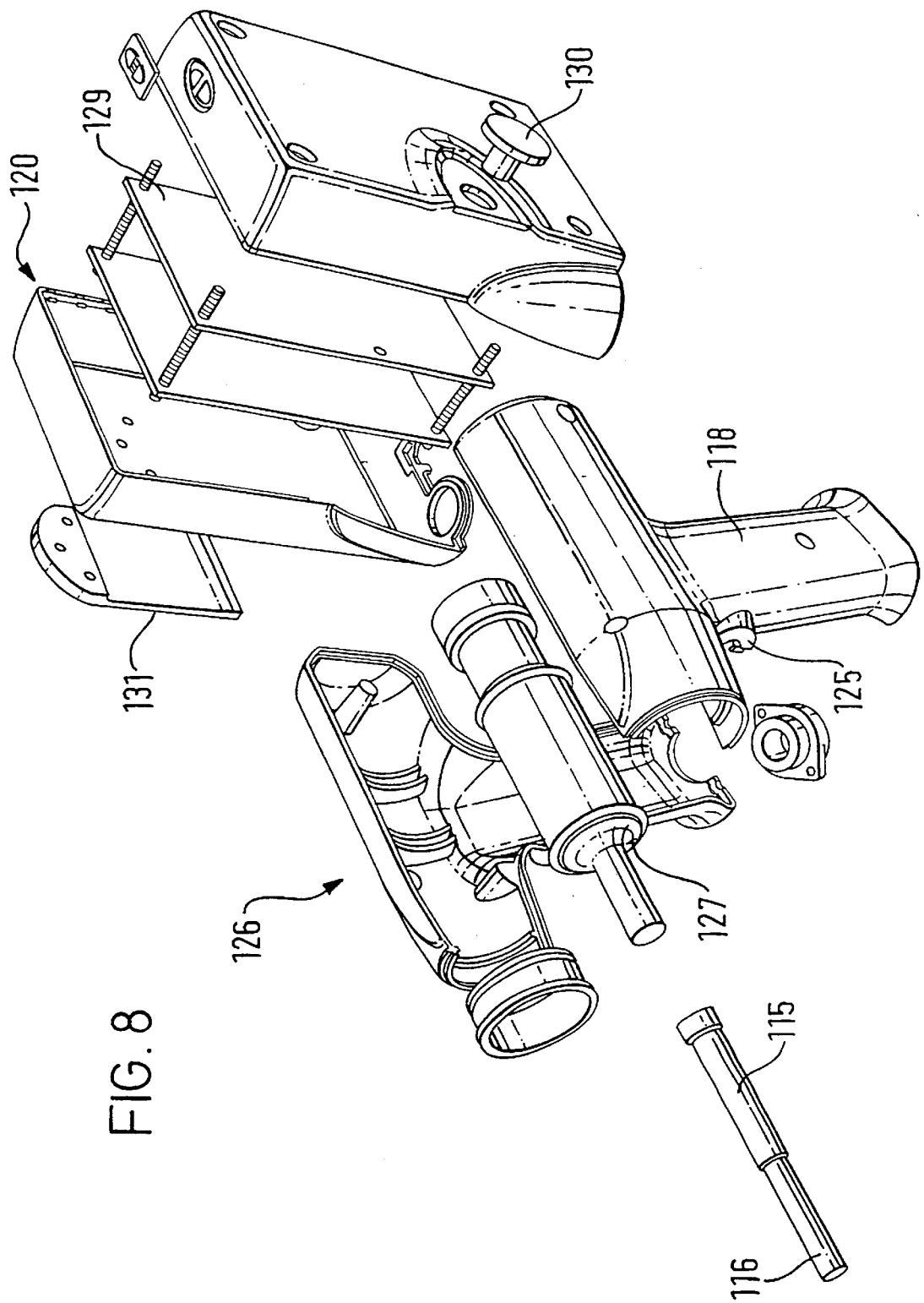
FIG. 8 is a schematic exploded perspective view of an apparatus similar to the apparatus of FIG. 7.

Referring to FIG. 8 a most preferred embodiment of apparatus according to the invention is shown. Similarly to the embodiment of FIG. 7, the apparatus comprises a hand manipulatable probe unit 126 and a separate power control unit 120, the respective units being connected by a flexible power connection line (umbilical) not shown.

The probe unit includes an ultrasonic generator stack 127 connected to a coaxially aligned elongate titanium sonotrode probe 115. The probe reduces in diameter toward the distal tip end in order to enhance the vibration delivery characteristics at the tip 116. The probe unit includes a handle extension 118 extending transversely to the axial direction of the probe 115, and is provided with a switch 125 enabling operational triggering of the ultrasonic generator 127.

The power control unit 120 includes a support chassis 129 for supporting electronic control and power circuitry. Parameters of operation can be set by means of controls such as the amplitude adjustment control 130. A belt clip 131 is provided permitting the power control unit 120 to be mounted on the belt or other apparel of an operative.

The invention provides that, by using high frequency vibration delivered by the ultrasonic horn 4, the resin viscosity decreases permitting more free flow into the crack (this is aided, particularly, where the ultrasonic vibration is used to atomise the resin); furthermore, high frequency vibration of the material comprising the laminated windscreen aides in permitting penetration of the resin into the crack 2. The ultrasonic vibration also acts to disperse air bubbles present in the resin, and hence produce a repair of maximum optical quality finish.

Following removal of the high frequency, the resin viscosity returns to substantially its original value almost instantly.

Following curing of the resin, any excess resin around the crack on the outer surface of windscreen 1 may be removed using conventional (typically abrasive) techniques.

What is claimed is:

1. A method of repairing an elongate crack in a vehicle windshield, the method comprising:
    i) infilling the elongate crack with a repair material;
    ii) applying high frequency vibration to the windshield using a tip of an elongate vibration delivery probe of a high frequency vibration applicator, the high frequency vibration applicator further comprising a high frequency vibration generator and a handle grip for manipulation of the high frequency vibration applicator by a user; and
    iii) manipulating the high frequency vibration applicator to track the probe in a longitudinal direction of the elongate crack.

2. A method according to claim 1, wherein the vibration generator comprises an ultrasonic vibration generator operating substantially in the range of 20 KHz–150 KHz.

3. A method according to claim 2, wherein the ultrasonic vibration generator operates substantially in the range of 35 KHz–55 KHz.

4. A method according to claim 1, wherein infilling the elongate crack comprises:
    i) applying the repair material in flowable form to the elongate crack; and
    ii) applying a cover strip or sheet in register with the windshield to provide a substantially sealed zone encompassing the repair material in at least a portion of the elongate crack.

5. A method according to claim 4, further comprising:
    removing the cover strip or sheet; and
    curing the repair material.

6. A method according to claim 4, further comprising placing a coupling material between the tip of the elongate vibration delivery probe and the windshield for enhanced vibration transmissive coupling of the vibration delivery probe and the windshield.

7. Windshield repair kit for repairing a crack in a vehicle windshield, the kit comprising:
    i) a high frequency vibration applicator including a high frequency vibration generator, an elongate vibration delivery probe to deliver high frequency vibration from the generator to the windshield via a tip of the probe, and a handle grip for manipulation of the high frequency vibration applicator by a user; and
    ii) repair material for infilling the crack and upon which vibration delivered by the high frequency vibration applicator acts.

8. Kit according to claim 7, wherein the vibration generator comprises an ultrasonic vibration generator.

9. Kit according to claim 8, wherein the ultrasonic vibration generator includes an ultrasonic transducer operable substantially in the range of 20 KHz–150 KHz.

10. Kit according to claim 9, wherein the ultrasonic vibration generator includes an ultrasonic transducer operable substantially in the range of 35 KHz–55 KHz.

11. Kit according to claim 7, wherein the kit comprises:
    i) a hand manipulatable probe unit comprising the elongate vibration delivery probe and the high frequency vibration generator;
    ii) a power control unit discrete from the probe unit, the power control unit comprising control circuitry for modifying the operation of the vibration generator; and
    iii) an elongate flexible power linkage between the probe unit and the control unit.

12. Kit according to claim 11, wherein the probe unit includes switch means permitting selective operation of the vibration generator.

13. Kit according to claim 11, wherein the control unit includes support means permitting the control unit to be supported on apparel worn by an operative.

14. Kit according to claim 13, wherein the support means comprises a support clip arrangement.

15. Kit according to claim 7, wherein the elongate vibration delivery probe comprises a rigid material, and wherein the handle grip extends substantially transversely to an axial direction of the probe.

16. Kit according to claim 7, wherein the probe tip is of smaller cross sectional area relative to a portion of the probe less distal.

17. Kit according to claim 7, wherein the cross sectional area of the probe tip is 1 cm$^2$ or less.

18. Kit according to claim 7, wherein the cross sectional area of the probe tip is 0.5 cm$^2$ or less.

* * * * *

UNITED STATES PATENT AND TRADEMARK OFFICE
CERTIFICATE OF CORRECTION

PATENT NO. : 6,656,541 B1
DATED : December 2, 2003
INVENTOR(S) : Matthew Derek Archer et al.

It is certified that error appears in the above-identified patent and that said Letters Patent is hereby corrected as shown below:

<u>Title page,</u>
Item [75], Inventors, "Carmarhtenshire" should read -- Carmarthenshire --.

Signed and Sealed this

Sixteenth Day of March, 2004

JON W. DUDAS
*Acting Director of the United States Patent and Trademark Office*